(12) United States Patent
Stewart et al.

(10) Patent No.: US 9,378,465 B2
(45) Date of Patent: Jun. 28, 2016

(54) METHODS AND SYSTEMS OF CLASSIFYING SPAM URL

(71) Applicant: Facebook, Inc., Menlo Park, CA (US)

(72) Inventors: Allan Stewart, Menlo Park, CA (US); Eugene Zarakhovsky, Seattle, WA (US); Christopher Palow, London (GB); Chetan Gowda, Mountain View, CA (US); Brent Dorman, Seattle, WA (US)

(73) Assignee: FACEBOOK, INC., Menlo Park, CA (US)

( * ) Notice: Subject to any disclaimer, the term of this patent is extended or adjusted under 35 U.S.C. 154(b) by 421 days.

(21) Appl. No.: 13/872,811

(22) Filed: Apr. 29, 2013

(65) Prior Publication Data

US 2014/0324741 A1 Oct. 30, 2014

(51) Int. Cl.
*G06N 5/02* (2006.01)
*G06N 99/00* (2010.01)

(52) U.S. Cl.
CPC .................................. *G06N 99/005* (2013.01)

(58) Field of Classification Search
None
See application file for complete search history.

(56) References Cited

U.S. PATENT DOCUMENTS

2006/0239219 A1* 10/2006 Haffner ................. H04L 41/142
370/321
2008/0209552 A1* 8/2008 Williams ................ G06F 21/31
726/22

OTHER PUBLICATIONS

Thomas, Kurt, et al. "Design and evaluation of a real-time url spam filtering service." Security and Privacy (SP), 2011 IEEE Symposium on. IEEE, 2011.*
Ma, Justin, et al. "Beyond blacklists: learning to detect malicious web sites from suspicious URLs." Proceedings of the 15th ACM SIGKDD international conference on Knowledge discovery and data mining. ACM, 2009.*
Ribeiro, M.T., et al., "Spam Detection Using Web Page Content: a New Battleground," CEAS '11 Proceddings of the 8th Annual Collaboration, Electronic messaging, Anti-Abuse and Spam Conference, pp. 83-91 (2011).
Song, J., et al., "Spam Filtering in Twitter using Sender-Receiver Relationship," RAID'11 Proceeding of the 14th International Confernce on Recent Advances in Intrusion Detection, pp. 301-317 (2011).
Lam, H., et al., "A Learning Approach to Spam Detection based on Social Networks," Proceedings of the Fourth Conference on Email and Anti-Spam (CEAS), pp. 1-9 (2007).
Xu, Q., et al., "SMS Spam Detection Using Non-Content Features," Intelligent Systems, IEEE Nov.-Dec. 2012 (Publication Online: Jan. 17, 2012), vol. 27(6), pp. 44-51.

* cited by examiner

*Primary Examiner* — Kakali Chaki
*Assistant Examiner* — Kevin W Figueroa
(74) *Attorney, Agent, or Firm* — Perkins Coie LLP

(57) ABSTRACT

A method of operation of a URL spam detection system includes: identifying a feature dimension of a user action on a social networking system to detect anomalies; extracting URL chunks from a content associated with the user action; aggregating a non-content feature of the user action along the feature dimension into a URL distribution store to produce a feature distribution for each of the URL chunks; determining whether the feature distribution of a particular URL chunk within the URL chunks exceeds an expectation threshold for the feature dimension; and classifying the particular URL chunk as an illegitimate URL when the feature distribution exceeds the expectation threshold to restrict access to a particular URL chunk on a social networking system.

21 Claims, 6 Drawing Sheets

METHODS AND SYSTEMS OF CLASSIFYING SPAM URL

FIELD OF INVENTION

This invention relates generally to a spam detection system, and in particular to classifying URLs as spam based on a reputation system

BACKGROUND

The Internet provides a vast source of information. Unfortunately, spammers take advantage of the Internet to distribute spam messages through illegitimate means to accomplish their own objectives. Anti-spam technology approaches the problem by filtering a message by detecting spam links in messages based on the contents directed to by the links. Anti-spam technology that filters based on a uniform resource locator (URL) generally blacklists the URL when the destination/the landing page of the URL contains features associated with spam. This methodology requires that the destination of the URL be crawled prior to determining that the URL should be blacklisted.

SUMMARY

Techniques to filter spam within any information sharing system, particularly social networking systems, are disclosed. The techniques include a reputation system of classifying URLs, such as under classification states including allowable, suspicious, or bad, based on statistics related to sender users who are sharing the URLs, including attributes about the sender users or a history of user actions that led to sharing of the URLs. The techniques enable classification of spam URLs without the need to crawl the landing pages of the URLs and without the need to understand what constitute spam content. This technique enables a system to detect anomalies from non-content features related to sharing of URLs by a sender, such as sender features or forum features.

This technique is discovered to be advantageous because the reputation system is resistant to cloaking because of its independence from scraping. Independence from scraping enables a URL classification scheme that can catch attacks at scale that has not been caught at scale previously. This technique is also advantageous because the technique reduces the variable space of which the spammers/adversaries can try to game the reputation system. For example, generally systems that scrape rely on known whitelists and blacklists of advertisement networks, but that information is incomplete and the spammers can jump from one ad network to another advertisement network. However, in the techniques disclosed herein, the URL classifier uses rules that detect the attack vectors (fake accounts, phishing, malware attack vectors, and etc.) which generally do not change often.

Under this classification scheme, allowable URLs and suspicious URLs can both be accessed. However, suspicious URLs are scrutinized by the reputation system to determine whether they should be blacklisted as bad. A "bad" URL is a classification that leads to access restriction or interaction restrictions related to the bad URL or contents including the bad URL. For example, user actions to interact with social objects containing bad URLs on the social networking system can also be restricted. The classification can include a number of other states, including unknown URLs, manually white listed URLs, and specific classes of bad URLs.

The spam detection system can classify URLs based on user action statistics. The user action statistics include sender features, forum features, and action features. The user action statistics can be non-content features. The user action statistic is tracked via a statistic collection module. A number of actions can trigger the statistic collection module to update the user action statistic of a URL in real time. For example, the actions may include a comment, a post, a share, a recommendation, or a message through a social networking website containing a URL. A URL classification module can then synchronously or asynchronously classify the URL based on expectation thresholds on current feature distributions of the user action statistic. The expectation thresholds can be determined manually or by machine learning. The manual method may be assisted by computing a background distribution of user action statistics including sender statistics, and selecting a threshold at a significant distance from the background distribution, such as a predetermined number of standard deviations. The expectation thresholds can be determined based on expected distribution of the sender statistic, where the expected distribution can be a global distribution of all senders or a distribution of a category of senders.

Some embodiments of the invention have other aspects, elements, features, and steps in addition to or in place of what is described above. These potential additions and replacements are described throughout the rest of the specification

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
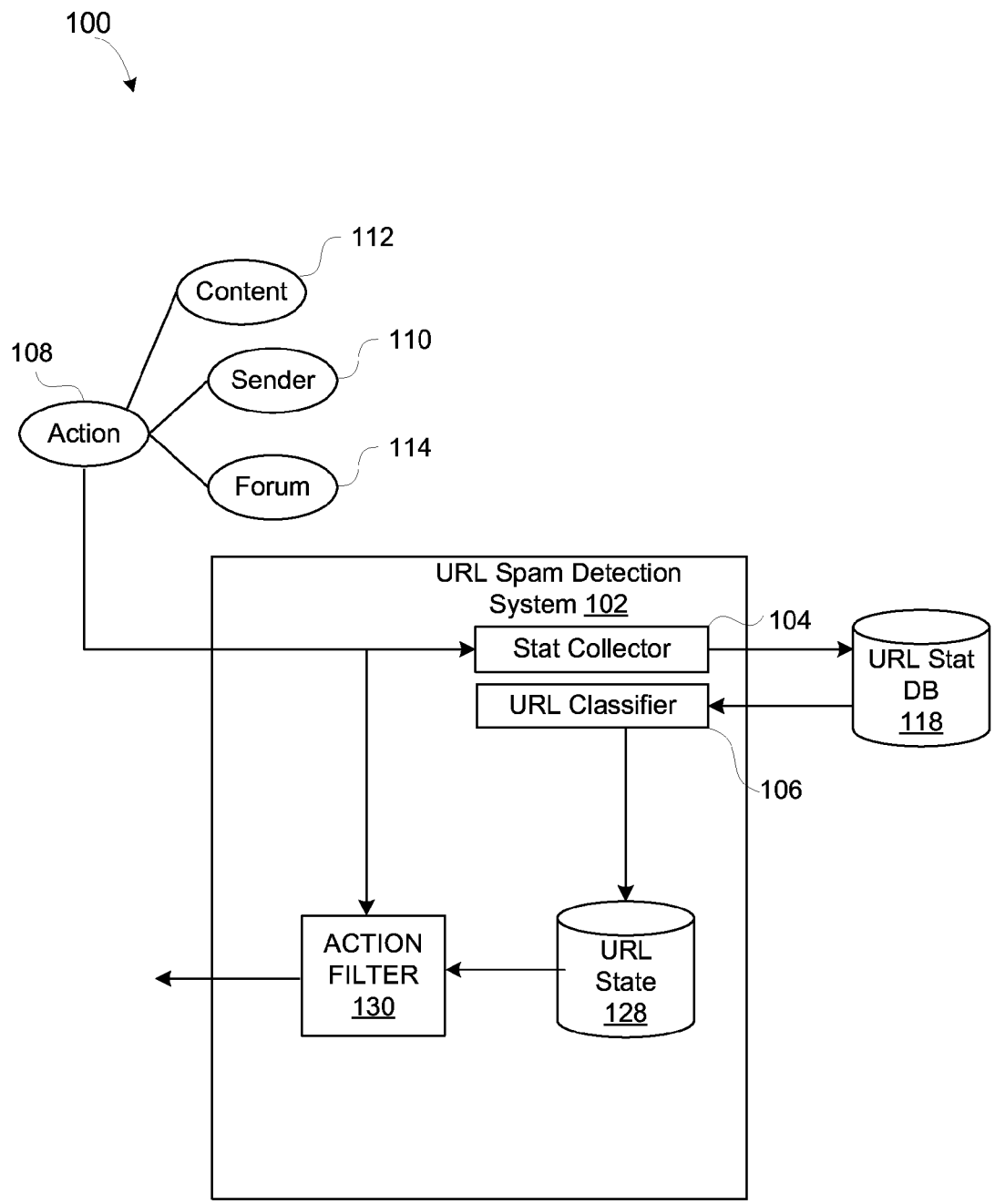
FIG. 1 is an illustration of a social networking system with a mechanism to classify URL for spam filtering.

FIG. 1 is an illustration of a social networking system 100 with a mechanism to classify URL for spam filtering. The social networking system 100 can be implemented by a computer system, such as the computer system 600 described in FIG. 6. The social networking system 100 includes a URL spam detection system 102. The URL spam detection system 102 can also be implemented by a computer system, either separately or integral to the social networking system 100. Mechanisms to classify URL for spam filtering are implemented by the URL spam detection system 102.

The URL spam detection system 102 includes a statistic collector module 104 and a URL classifier module 106. Operations of the statistic collector module 104 are triggered when an action 108 is recorded by the social networking system 100. The action 108 is an interaction between a user and the social networking system 100. The action 108 is performed by a sender to share or associate with content on a forum. Thus the action 108 is associated with sender information 110 (e.g., sender identifier and sender attributes), action content 112, forum information 114 (e.g., recipient identifier and recipient attribute), other user-action related information, or any combination thereof.

The sender information 110 can include sender profile, sender action posting methods (e.g., via widgets or mobile application), sender identifier, sender account information, sender hardware or software information, sender behavior/activity information; metadata related to the sender, other sender related information, or any combination thereof. The action content 112 includes the actual content related to the action 108. The forum information 114 can include recipient identifier, forum identifier (e.g., a recipient account's inbox, a recipient account's wall, a public page, or etc.), forum type, metadata related to the forum, other forum related information, or any combination thereof. The action 108, for example, can be a message, a post, a share, a like, or a recommendation. The sender can be a person with a user account, a group, or a page on the social networking system 100. The forum can be a personal wall, a personal inbox, a news feed, a social networking page, an application, or other channels on the social networking system 100. The action content 112 can include body of the message, body of the post, content that is shared, content that is recommended, or content that is "liked", where a "like" is an explicit indication of approval and/or association from a social networking account.

The statistic collector module 104 extracts URLs from the action content 112 into a URL chunk list. The redirections of the URLs are also added to the URL chunk list. In turn, subsets of the URLs and subsets of the redirections are also added to the URL chunk list. For example, the action content 112 may include a URL: "www.bit.ly/foo". The URL "www.bit.ly/foo" redirects to "bar.blogspot.com/foo". The URL chunk list can then include: "bit.ly/foo", "bit.ly", "ly", "bar.blogspot.com/foo", "bar.blogspot.com/", "blogspot.com", and "com". The extraction of the URL chunks can be delimited by punctuation and special characters. Each item in the URL chunk list may denote a destination on a network, such as the Internet, or a group of destinations on the network.

The statistic collector module 104 then aggregates one or more non-content related feature of the action 108. For example, the statistic collector module 104 can store and aggregate a sender feature from the sender information 110. For another example, the statistic collector module 104 can store and aggregate a forum feature from the forum information 114. The aggregated features are stored in a URL statistic database 118. The URL statistic database 118 can be part of the URL spam detection system 102 or an external database coupled to the URL spam detection system 102.

The URL classifier module 106 analyzes feature distributions store on the URL statistic database 118 to classify individual URL chunks. The feature distributions are statistical distributions along a feature dimension related to a URL chunk that has been tracked by the statistic collector 104. The feature distributions can include binomial distributions, discrete distributions, and continuous distributions. Binomial distributions, for example, includes whether the sender account is new, whether the sender account is potentially fake, or whether the sender account is potentially compromised due to suspicious login attempts. The features of the binomial distributions may be extracted based on an external system, such as an anti-phishing system, a fake account detection system, a malware detection system, or any combination thereof. The binomial distributions may be stored as a normalized feature occurrence counter, such as spam over impressions divided by number of a URL chunk is seen. Discrete distributions, for example, include age of the sender or type of the sender (e.g., individual vs. group). Continuous distributions, for example, include time since the creation of the sender account (i.e., account age) and a number of times a URL chunk is reported as a spam over the number of impressions of the URL chunk shown to users.

The feature distributions are compared against an expectation threshold. The expectation threshold can be a range, a specific value, a variance or standard deviation from an expected distribution, or any combination thereof. The expectation threshold can be determined manually or by machine learning. The manual process may be assisted by computing a background distribution (e.g., a global distribution or a whitelisted distribution) of non-content features and visualizing the background distribution for a system administrator tasked with selecting the expectation threshold. When a feature distribution exceeds an expectation threshold, a classification of the URL chunk is changed in a URL state store 128. The URL state store 128 contains discrete level of suspicion that the URL chunk is associated with the illegitimate content.

An action filter module 130 of the URL spam detection system 102 monitors the URL state store 128. The action filter module 130 acts as a gateway to the execution of the action 108 associated with the URL chunk. Certain classifications of the URL chunk in the URL state store 128 enables the action 108 associated with the URL chunk to execute on the social networking system 100, such as publishing a message on the news feed. Other classifications of the URL chunk in the URL state store 128 prevents the action 108 from being fully executed, such as requiring additional steps to execute or prevention of execution.

Social Networking System Overview

The URL spam detection system 102 can be utilized in any data sharing system. Particularly, the URL spam detection system 102 can be utilized in the social networking system, such as the social networking system 100. Social networking systems commonly provide mechanisms allowing users to interact with objects and other users both within and external to the context of the social networking system. A social networking system user may be an individual or any other entity, such as a business or other non-person entity. The social networking system may utilize a web-based interface comprising a series of inter-connected pages displaying and allowing users to interact with social networking system objects and information. For example, a social networking system may display a page for each social networking system user comprising objects and information entered by or related to the social networking system user (e.g., the user's "profile"). Social networking systems may also contain pages containing pictures or videos, dedicated to concepts, dedicated to users with similar interests ("groups"), or containing communications or social networking system activity to, from or by other users. Social networking system pages may contain links to other social networking system pages, and may include additional capabilities such as search, real-time communication, content-item uploading, purchasing, advertising, and any other web-based technology or ability. It should be noted that a social networking system interface may be accessible from a web browser or a non-web browser application, such as a dedicated social networking system mobile device or computer application. "Page" as used herein may be a web page, an application interface or display, a widget displayed over a web page or application, a box or other graphical interface, an overlay window on another page (whether within or outside the context of a social networking system), or a web page external to the social networking system with a social networking system plug in or integration capabilities.

As discussed above, a social graph includes a set of nodes (representing social networking system objects, also known as social objects) interconnected by edges (representing interactions, activity, or relatedness). A social networking system object may be a social networking system user, nonperson entity, content item, group, social networking system page, location, application, subject, concept or other social networking system object, such as a movie, a band, or a book. Content items include anything that a social networking system user or other object may create, upload, edit, or interact with, such as messages, queued messages (e.g., email), text and SMS (short message service) messages, comment messages, messages sent using any other suitable messaging technique, an HTTP link, HTML files, images, videos, audio clips, documents, document edits, calendar entries or events, and other computer-related files. Subjects and concepts, in the context of a social graph, comprise nodes that represent any person, place, thing, or abstract idea.

A social networking system may allow a user to enter and display information related to the user's interests, education and work experience, contact information, and other biographical information in the user's profile page. Each school, employer, interest (for example, music, books, movies, television shows, games, political views, philosophy, religion, groups, or fan pages), geographical location, network, or any other information contained in a profile page may be represented by a node in the social graph. A social networking system may allow a user to upload or create pictures, videos, documents, songs, or other content items, and may allow a user to create and schedule events. Content items and events may be represented by nodes in the social graph.

A social networking system may provide a variety of means to interact with nonperson objects within the social networking system. For example, a user may form or join groups, or become a fan of a fan page within the social networking system. In addition, a user may create, download, view, upload, link to, tag, edit, or play a social networking system object. A user may interact with social networking system objects outside of the context of the social networking system. For example, an article on a news web site might have a "like" button that users can click. In each of these instances, the interaction between the user and the object may be represented by an edge in the social graph connecting the node of the user to the node of the object. A user may use location detection functionality (such as a GPS receiver on a mobile device) to "check in" to a particular location, and an edge may connect the user's node with the location's node in the social graph.

Social networking systems allow users to associate themselves and establish connections with other users of the social networking system. When two users explicitly establish a connection in the social networking system, they become "friends" (or, "connections") within the context of the social networking system. Being friends in a social networking system may allow users access to more information about each other than would otherwise be available to unconnected users. For instance, being friends may allow a user to view another user's profile, to see another user's friends, or to view pictures of another user. Likewise, becoming friends within a social networking system may allow a user greater access to communicate with another user, such as by email (internal and external to the social networking system), instant message, text message, phone, or any other communicative interface. Being friends may allow a user access to view, comment on, download, endorse or otherwise interact with another user's uploaded content items. Establishing connections, accessing user information, communicating, and interacting within the context of the social networking system may be represented by an edge between the nodes representing two social networking system users.

In addition to explicitly establishing a connection in the social networking system, users with common characteristics may be considered connected (such as a soft or implicit connection) for the purposes of determining social context for use in determining the topic of communications. In one embodiment, users who belong to a common network are considered connected. For example, users who attend a common school, work for a common company, or belong to a common social networking system group may be considered connected. In one embodiment, users with common biographical characteristics are considered connected. For example, the geographic region users were born in or live in, the age of users, the gender of users and the relationship status of users may be used to determine whether users are connected. In one embodiment, users with common interests are considered connected. For example, users' movie preferences, music preferences, political views, religious views, or any other interest may be used to determine whether users are connected. In one embodiment, users who have taken a common action within the social networking system are considered connected. For example, users who endorse or recommend a common object, who comment on a common content item, or who RSVP to a common event may be considered connected. A social networking system may utilize a social graph to determine users who are connected with a particular user in order to determine or evaluate the social context of the communications of the particular user, as will be described below in greater detail.

A social networking system may provide a variety of communication channels to users. For example, a social networking system may allow a user to email, instant message, or text/SMS message, one or more other users; may allow a user to post a message to the user's wall or profile or another user's wall or profile; may allow a user to post a message to a group or a fan page; or may allow a user to comment on an image, wall post or other content item created or uploaded by the user or another user. In one embodiment, a user posts a status message to the user's profile indicating a current event, state of mind, thought, feeling, activity, or any other present-time relevant communication. A social networking system may allow users to communicate both within and external to the social networking system. For example, a first user may send a second user a message within the social networking system, an email through the social networking system, an email external to but originating from the social networking system, an instant message within the social networking system, and an instant message external to but originating from the social networking system. Further, a first user may comment on the profile page of a second user, or may comment on objects associated with a second user, such as content items uploaded by the second user.

Social Networking System Environment and Architecture

Figure 2:
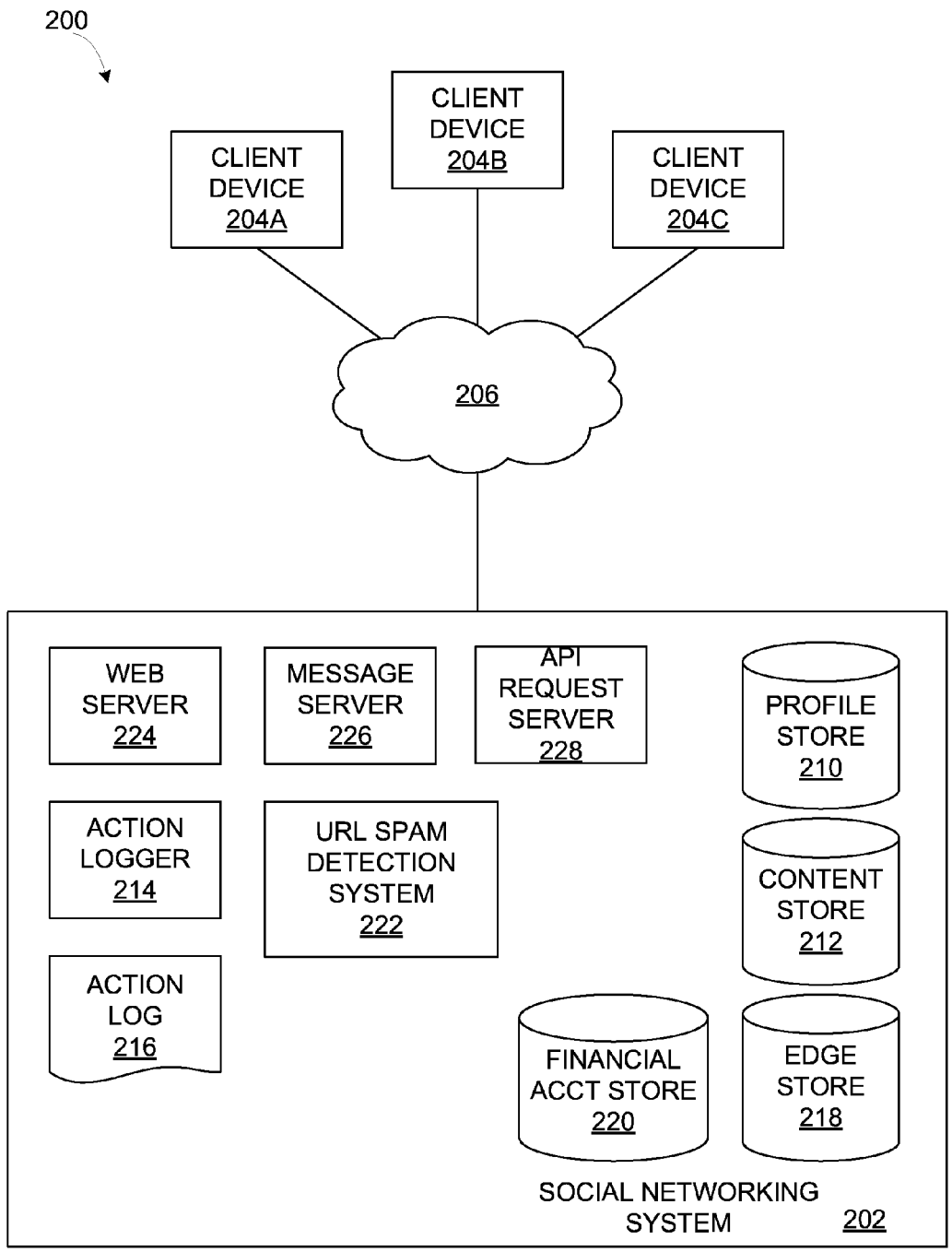
FIG. 2 is a high level block diagram of a system environment suitable for a social networking system, according to one embodiment.

Referring now to FIG. 2, therein is shown a high level block diagram of a system environment 200 suitable for a social networking system 202, according to one embodiment. The system environment 200 shown in FIG. 2 includes the social networking system 202, a client device 204A, and a network channel 206. The system environment 200 can include other client devices as well, such as a client device 204B and a client device 204C. In other embodiments, the system environment 200 may include different and/or additional components than those shown by FIG. 2. The social networking system 202 can be the social networking system 100 of FIG. 1.

The social networking system 202, further described below, comprises one or more computing devices storing user profiles associated with users and/or other objects as well as connections between users and other users and/or objects. In use, users join the social networking system 202 and then add connections to other users or objects of the social networking system to which they desire to be connected. As further described below in conjunction with FIG. 2, users of the social networking system 202 may be individuals or entities such as businesses, organizations, universities, manufacturers. The social networking system 202 allows its users to interact with each other as well as with other objects maintained by the social networking system 202. In some embodiments, the social networking system 202 allows users to interact with third-party websites and a financial account provider.

Based on stored data about users, objects and connections between users and/or objects, the social networking system 202 generates and maintains a "social graph" comprising a plurality of nodes interconnected by a plurality of edges. Each node in the social graph represents an object or user that can act on another node and/or that can be acted on by another node. An edge between two nodes in the social graph represents a particular kind of connection between the two nodes, which may result from an action that was performed by one of the nodes on the other node. For example, when a user identifies an additional user as a friend, an edge in the social graph is generated connecting a node representing the first user and an additional node representing the additional user. The generated edge has a connection type indicating that the users are friends. As various nodes interact with each other, the social networking system 202 adds and/or modifies edges connecting the various nodes to reflect the interactions.

The client device 204A is a computing device capable of receiving user input as well as transmitting and/or receiving data via the network channel 206. In one embodiment, the client device 204A is a conventional computer system, such as a desktop or laptop computer. In another embodiment, the client device 204A may be a device having computer functionality, such as a personal digital assistant (PDA), mobile telephone, a tablet, a smart-phone or similar device. In yet another embodiment, the client device 204A can be a virtualized desktop running on a cloud computing service. The client device 204A is configured to communicate with the social networking system 202, and/or the financial account provider via the network channel 206. In one embodiment, the client device 204A executes an application allowing a user of the client device 204A to interact with the social networking system 202. For example, the client device 204A executes a browser application to enable interaction between the client device 204A and the social networking system 202 via the network channel 206. In another embodiment, a the client device 204A interacts with the social networking system 202 through an application programming interface (API) that runs on the native operating system of the client device 204A, such as IOS® or ANDROID™.

The client device 204A is configured to communicate via the network channel 206, which may comprise any combination of local area and/or wide area networks, using both wired and wireless communication systems. In one embodiment, the network channel 206 uses standard communications technologies and/or protocols. Thus, the network channel 206 may include links using technologies such as Ethernet, 802.11, worldwide interoperability for microwave access (WiMAX), 3G, 4G, CDMA, digital subscriber line (DSL), etc. Similarly, the networking protocols used on the network channel 206 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over the network channel 206 may be represented using technologies and/or formats including hypertext markup language (HTML) or extensible markup language (XML). In addition, all or some of links can be encrypted using conventional encryption technologies such as secure sockets layer (SSL), transport layer security (TLS), and Internet Protocol security (IPsec).

The social networking system 202 shown by FIG. 2 includes a profile store 210, a content store 212, an action logger 214, an action log 216, an edge store 218, a financial account store 220, a URL spam detection system 222, a web server 224, a message server 226, and an API request server 228. In other embodiments, the social networking system 202 may include additional, fewer, or different modules for various applications. Conventional components such as network interfaces, security mechanisms, load balancers, failover servers, management and network operations consoles, and the like are not shown so as to not obscure the details of the system architecture.

Each user of the social networking system 202 is associated with a user profile, which is stored in the profile store 210. A user profile includes declarative information about the user that was explicitly shared by the user, and may also include profile information inferred by the social networking system 202. In one embodiment, a user profile includes multiple data fields, each data field describing one or more attributes of the corresponding user of the social networking system 202. The user profile information stored in the profile store 210 describes the users of the social networking system 100, including biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the social networking system 202 displayed in an image. A user profile in the profile store 210 may also maintain references to actions by the corresponding user performed on content items in the content store 212 and stored in the edge store 218.

As further described below, a user profile may be associated with one or more financial accounts, allowing the user profile to include data retrieved from or derived from a financial account. A user may specify one or more privacy settings, which are stored in the user profile, that limit information from a financial account that the social networking system 202 is permitted to access. For example, a privacy setting limits the social networking system 202 to accessing the transaction history of the financial account and not the current account balance. As another example, a privacy setting limits the social networking system 202 to a subset of the transaction history of the financial account, allowing the social networking system 202 to access transactions within a specified time range, transactions involving less than a threshold transaction amounts, transactions associated with specified vendor identifiers, transactions associated with vendor identifiers other than specified vendor identifiers or any suitable criteria limiting information from a financial account identified by a user that is accessible by the social networking system 202. In one embodiment, information from the financial account is stored in the profile store 210. In other embodiments, it may be stored in the financial account store 220.

The content store 212 stores content items associated with a user profile, such as images, videos or audio files. Content items from the content store 212 may be displayed when a user profile is viewed or when other content associated with the user profile is viewed. For example, displayed content items may show images or video associated with a user profile or show text describing a user's status. Additionally, other content items may facilitate user engagement by encouraging a user to expand his connections to other users, to invite new users to the system or to increase interaction with the social network system by displaying content related to users, objects, activities, or functionalities of the social networking system 202. Examples of social networking content items include suggested connections or suggestions to perform other actions, media provided to, or maintained by, the social networking system 202 (e.g., pictures or videos), status messages or links posted by users to the social networking system, events, groups, pages (e.g., representing an organization or commercial entity), and any other content provided by, or accessible via, the social networking system.

The content store 212 also includes one or more pages associated with entities having user profiles in the profile store 210. An entity is a non-individual user of the social networking system 202, such as a business, a vendor, an organization or a university. A page includes content associated with an entity and instructions for presenting the content to a social networking system user. For example, a page identifies content associated with the entity's user profile as well as information describing how to present the content to users viewing the brand page. Vendors may be associated with pages in the content store 212, allowing social networking system users to more easily interact with the vendor via the social networking system 202. A vendor identifier is associated with a vendor's page, allowing the social networking system 202 to identify the vendor and/or to retrieve additional information about the vendor from the profile store 210, the action log 216 or from any other suitable source using the vendor identifier. In some embodiments, the content store 212 may also store one or more targeting criteria associated with stored objects and identifying one or more characteristics of a user to which the object is eligible to be presented.

The action logger 214 receives communications about user actions on and/or off the social networking system 202, populating the action log 216 with information about user actions. Such actions may include, for example, adding a connection to another user, sending a message to another user, uploading an image, reading a message from another user, viewing content associated with another user, attending an event posted by another user, among others. In some embodiments, the action logger 214 receives, subject to one or more privacy settings, transaction information from a financial account associated with a user and identifies user actions from the transaction information. For example, the action logger 214 retrieves vendor identifiers from the financial account's transaction history and identifies an object, such as a page, in the social networking system associated with the vendor identifier. This allows the action logger 214 to identify a user's purchases of products or services that are associated with a page, or another object, in the content store 212. In addition, a number of actions described in connection with other objects are directed at particular users, so these actions are associated with those users as well. These actions are stored in the action log 216.

In accordance with various embodiments, the action logger 214 is capable of receiving communications from the web server 224 about user actions on and/or off the social networking system 200. The action logger 214 populates the action log 216 with information about user actions to track them. This information may be subject to privacy settings associated with the user. Any action that a particular user takes with respect to another user is associated with each user's profile, through information maintained in a database or other data repository, such as the action log 216. Such actions may include, for example, adding a connection to the other user, sending a message to the other user, reading a message from the other user, viewing content associated with the other user, attending an event posted by another user, being tagged in photos with another user, liking an entity, etc.

The action log 216 may be used by the social networking system 202 to track user actions on the social networking system 202, as well as external website that communicate information to the social networking system 202. Users may interact with various objects on the social networking system 202, including commenting on posts, sharing links, and checking-in to physical locations via a mobile device, accessing content items in a sequence or other interactions. Information describing these actions is stored in the action log 216. Additional examples of interactions with objects on the social networking system 202 included in the action log 216 include commenting on a photo album, communications between users, becoming a fan of a musician, adding an event to a calendar, joining a groups, becoming a fan of a brand page, creating an event, authorizing an application, using an application and engaging in a transaction. Additionally, the action log 216 records a user's interactions with advertisements on the social networking system 202 as well as applications operating on the social networking system 202. In some embodiments, data from the action log 216 is used to infer interests or preferences of the user, augmenting the interests included in the user profile and allowing a more complete understanding of user preferences.

Further, user actions that happened in particular context, such as when the user was shown or was seen accessing particular content on the social networking system 200, are captured along with the particular context and logged. For example, a particular user could be shown/not-shown information regarding candidate users every time the particular user accessed the social networking system 200 for a fixed period of time. Any actions taken by the user during this period of time are logged along with the context information (i.e., candidate users were provided/not provided to the particular user) and are recorded in the action log 216. In addition, a number of actions described below in connection with other objects are directed at particular users, so these actions are associated with those users as well.

The action log 216 may also store user actions taken on external websites and/or determined from an external account associated with the user. For example, other websites or applications may recognize a user of the social networking system 202 through social plug-ins that enable the other websites to identify the user of the social networking system 202. Because users of the social networking system 202 are uniquely identifiable, the other websites may use the information about these users as they visit their websites. The action log 216 may record, through the social plug-in, data about these users, including webpage viewing histories or advertisements that were engaged.

In one embodiment, the edge store 218 stores the information describing connections between users and other objects on the social networking system 202 in edge objects. The edge store 218 can store the social graph described above. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 202, such as expressing interest in a page on the social networking system, sharing a link with other users of the social networking system, and commenting on posts made by other users of the social networking system. The edge store 218 stores edge objects that include information about the edge, such as affinity scores for objects, interests, and other users. Affinity scores may be computed by the social networking system 202 over time to approximate a user's affinity for an object, interest, and other users in the social networking system 202 based on the actions performed by the user. Multiple interactions of the same type between a user and a specific object may be stored in one edge object in the edge store 218, in one embodiment. In some embodiments, connections between users may be stored in the profile store 210, or the profile store 210 may access the edge store 218 to determine connections between users. Users may select from predefined types of connections, or define their own connection types as needed.

The web server 224 links the social networking system 200 via a network to one or more client devices; the web server 224 serves web pages, as well as other web-related content, such as Java, Flash, XML, and so forth. The web server 224 may communicate with the message server 226 that provides the functionality of receiving and routing messages between the social networking system 200 and client devices. The messages processed by the message server 226 can be instant messages, queued messages (e.g., email), text and SMS (short message service) messages, or any other suitable messaging technique. In some embodiments, a message sent by a user to another can be viewed by other users of the social networking system 200, for example, by the connections of the user receiving the message. An example of a type of message that can be viewed by other users of the social networking system besides the recipient of the message is a wall post. In some embodiments, a user can send a private message to another user that can only be retrieved by the other user.

The API request server 228 allows external systems to access information from the social networking system 200 by calling APIs. The information provided by the social network may include user profile information or the connection information of users as determined by their individual privacy settings. For example, a system interested in predicting the probability of users forming a connection within a social networking system may send an API request to the social networking system 200 via a network. The API request is received at the social networking system 200 by the API request server 228. The API request server 228 processes the request by determining the appropriate response, which is then communicated back to the requesting system via a network.

The social networking system 202 also includes the URL spam detection system 222. The URL spam detection system 222 can be the URL spam detection system 102 of FIG. 1. The URL spam detection system 222 can access the stores and modules of the social networking system 202 in order to classify URLs and URL chunks by different levels of suspicion. The URL spam detection system 222 can receive user interactions associated with a URL chunk from the client device 204A for aggregating feature distributions associated with the URL chunk. As feature distributions are aggregated, the URL spam detection system 222 can also work with other modules and stores of the social networking system 202 to manage access to contents available to the client device 204A based on the classification of URL chunks described in FIG. 1.

Figure 3:
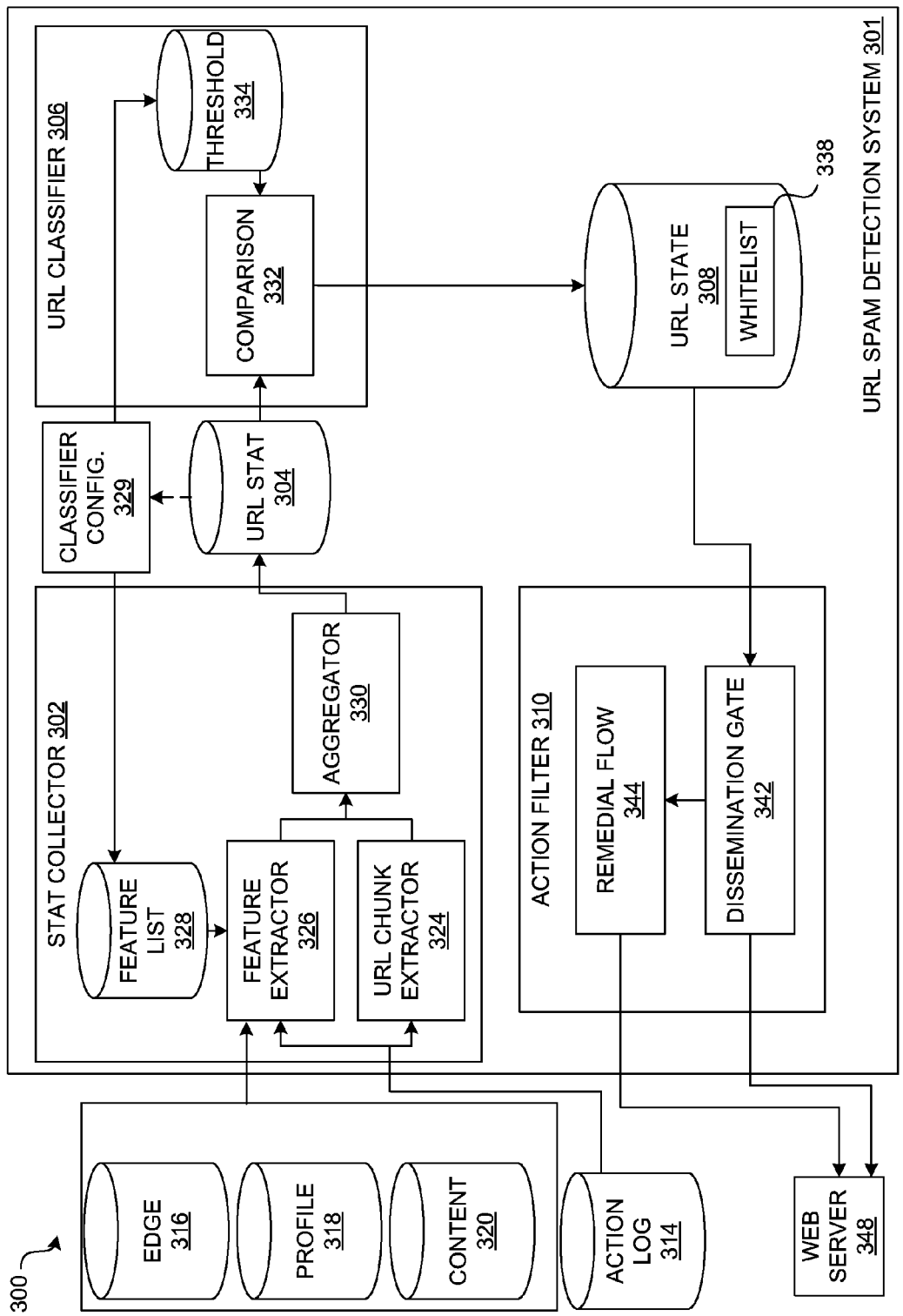
FIG. 3 is a control flow of a social networking system operating a URL spam detection system.

FIG. 3 is a control flow of a social networking system 300 operating a URL spam detection system 301. The URL spam detection system 301 can be the URL spam detection system 102 of FIG. 1 or the URL spam detection system 222 of FIG. 2. The URL spam detection system 301 can be implemented by a computer system with at least one processor and at least one non-transitory memory. The URL spam detection system 301 can be on the same computer system as the social networking system 300, the social networking system 100 of FIG. 1, or the social networking system 202 of FIG. 2. The URL spam detection system 301 can be implemented by a computer system described in FIG. 6.

One or more methods operating the URL spam detection system 301 to detect spam URLs may be implemented by modules and stores described below. The modules may be implemented as hardware components, software modules, or any combination thereof. For example, the modules described can be software modules implemented as instructions on a non-transitory memory capable of being executed by a processor or a controller on a machine.

Each of the modules may operate individually and independently of other modules. Some or all of the modules may be executed on the same host device or on separate devices. The separate devices can be coupled via a communication module to coordinate its operations. Some or all of the modules may be combined as one module. A single module may also be divided into sub-modules, each sub-module performing separate method step or method steps of the single module. The modules can share access to a memory space. One module may access data accessed by or transformed by another module. The modules may be considered "coupled" to one another if they share a physical connection or a virtual connection, directly or indirectly, allowing data accessed or modified from one module to be accessed in another module.

The URL spam detection system 301 may include additional, fewer, or different modules for various applications. Components such as cellular network interfaces, security functions, operating system(s), and the like are not shown so as to not obscure the details of the system.

The storages or "stores", described below are hardware components or portions of hardware components for storing digital data, such as by running a network accessible database. Each of the storage can be a single physical entity or distributed through multiple physical devices. Each of the storage can be on separate physical device or share the same physical device or devices. Each of the stores can allocate specific storage spaces for run-time applications.

The URL spam detection system 301 includes a statistic collector module 302, a URL statistics store 304, a URL classifier module 306, a URL state store 308, and an action filter module 310, such as the statistic collector module 104, the URL statistic database 118, the URL classifier module 106, the URL state store 128, and the action filter module 130, respectively. The statistic collector module 302 is coupled to an action log 314 of the social networking system 300, such as the action log 216 of FIG. 2. The statistic collector module 302 can also access an edge store 316, a profile store 318, and a content store 320, such as the edge store 218, the profile store 210, and the content store 212, respectively.

When a user action is logged in the action log 314, an associated piece of content can be identified by a URL chunk extractor module 324 of the statistic collector 302. The associated piece of content may be pre-existing within the content store 320. The URL chunk extractor module 324 is operable to extract every URL within the associated piece of content. Every URL and re-directions of every URL are parsed into one or more URL chunks.

When the user action is logged, a feature extractor module 326 is operable to extract one or more non-content features associated with the user action. The feature extractor module 326 may extract the non-content features directly from attributes of the user action, the sender account, or the forum of the user action. The feature extractor module 326 may also extract the non-content features by applying a transformation function on the attributes. The feature extractor module 326 may determine the non-content features via an external system, such as an anti-phishing system, a malware detection system, a drive-by infection detection system, a fake account detection system, or a combination thereof. The non-content features may include for example, sender features or forum features. Sender features and the forum features can be extracted from the profile store 318 and the edge store 316. For example, sender features include sender age, sender operation system, sender location, sender IP address, sender account age, or any combination thereof. Also for example, forum features include privacy level of forum, forum creation date, forum type (e.g., group/page message wall instead of personal message wall), or any combination thereof.

Which of the non-content features to extract are determined from a feature list store 328. The feature list store 328 is generated from a classifier configuration module 329. The classifier configuration module 329 may provide a user interface to define an attribute of a social object of the social networking system 300 as a specific feature or to define a specific function to calculate a feature from one or more attributes of social objects in the social networking system 300.

Alternatively, the classifier configuration module 329 can automatically identify one or more non-content features that distinguish URL dissemination anomalies from the expected scenarios of information dissemination via machine learning. For example, the classifier configuration module 329 can take in all available non-content features and train against known spam URL chunks and/or known reliable URL chunks. For another example, the classifier configuration module 329 can train against known spammer accounts and known reliable sender accounts to determine which sender dimension best differentiate the two types of accounts. The non-content features that best distinguishes the spam URL chunks can be stored in the feature list store 328.

An aggregator module 330 of the statistic collector 302 aggregates and stores the one or more non-content features associated with the extracted URL chunks to the URL statistic store 304. The aggregator module 330 can store the one or more non-content features in real-time. The aggregator module 330 can further store metadata for each instance of the non-content features aggregated. For example, the aggregator module 330 can store a timestamp of when the user action triggering the feature extraction occurred.

The aggregation of the non-content features in the URL statistics store 304 provides feature distributions associated with each URL chunk. The feature distributions can include a binomial distribution that stores how frequently a condition is true for a user action related to a URL chunk in a time window, such as last minute, last hour, last day, last week, last month, or any combination thereof. The feature distributions can also include a discrete distribution that stores counters of enumerated states along a feature dimension for user actions logged to be related to the URL chunk. The feature distributions can further be a continuous distribution that stores values along a feature dimension for user actions logged to be related to the URL chunk.

The URL classifier module 306 utilizes the feature distributions to classify the suspicion level of each URL chunk. A comparison module 332 of the URL classifier module 306 compares a feature distribution along a feature dimension against an expected distribution. Comparison with the expected distribution may be facilitated by an expectation threshold of the feature dimension in a threshold store 334. The feature dimensions are non-content features identified in the feature list store 328. The expectation threshold may be a distribution range (e.g., a minimum feature value and the maximum feature value). Alternatively, the expectation threshold may be threshold range for a mean, a median, or a mode of the feature distribution. The expectation threshold may include other quantitative ways of specifying an expected feature distribution including specifying an expected variance of the feature distribution.

The expectation threshold in the threshold store 334 may be generated from the classifier configuration module 329. The classifier configuration module 329 may provide a user interface for a system administrator to specify the expectation threshold. The user interface provided may identify and illustrate a global feature distribution along the associated feature dimensions for all URL chunks tracked by the URL spam detection system 301. Because the global feature distribution includes all user actions tracked, most reliable and legitimate dissemination of URL chunks would have feature distributions similar to the global feature distribution. The system administrator can then use the illustration/visualization to select the expectation thresholds. The user interface may also select and provide feature distributions of legitimate white listed URL chunks that may deviate from the global feature distribution to aid the system administrator from better differentiating between an illegitimate URL chunk and an approved web site with distinguishing feature distributions. The user interface may also allow the system administrator to adjust the expectation threshold based on recent events.

Alternatively the expectation threshold may be generated automatically in the classifier configuration module 329, such as via machine learning. For example, the machine learning may be based on a random forest classification method. The machine learning may train based on the URL statistic store 306. In one example, an expectation threshold is generated based on an expected feature distribution along an associated feature dimension. The expected feature distribution may be trained from the global feature distribution along the associated feature dimension for all URL chunks tracked by the URL statistic store 304. The expected threshold may be selected based on an algorithm to optimize differentiation between illegitimate URL chunks (e.g., represented by known spammer accounts or known spam-related URL chunks) and legitimate URL chunks (e.g., represented by the expected feature distribution, such as feature distributions of known reliable sender accounts and known reliable URLs). In another example, the expected feature distribution may be trained from a feature distribution along the same feature dimension for URL chunks known to be reliable without spam (e.g., white listed URL chunks).

Multiple expectation thresholds may be generated per feature dimensions. For example, regional expectation thresholds may be generated to account for differences in regional feature distributions. Hence, user actions associated with a URL chunk from a particular region (virtual or physical) may be compared against an expectation threshold of the particular region.

Classification states of URL chunks are stored in a URL state store 308. Each classification state reflects the level of suspicion for each of the URL chunks. The URL state store 308 may also include a white list 338. The white list 338 includes a listing of URL chunks that is labeled as reliable without spam. Other URL chunks within the URL state store 308 may change their classification states based on the comparison module 332. The classification states may include at least: an unknown state, an allowable state, a white list state, a suspicious state, and a bad state. The unknown state, the allowable state, and the white list state describe classification states where the URL chunks are allowed to be accessed by users of the social networking system 300. The suspicious state describes a classification state where the URL chunks are monitored further to determine whether the URL chunks are disseminated via illegitimate means. The monitoring may include additional interactions with users who access content objects containing the URL chunks. The bad state describes the classification state where the URL chunks are prevented from being accessed by users of the social networking system 300. Optionally, the bad state may be divided into specific bad states describing types of illegitimate channel of sharing content.

In some examples of the URL classifier module 306, classification of a specific URL chunk may be based on classification of related family of URL chunks, such as other child URL chunk of the parent domain URL chunk. For example, if a large number of known subdomains of "somedomain.com" are classified as in the bad state or the suspicious state, another subdomain of "somedomain.com" may be classified under a suspicious state automatically. Even if feature distributions of a parent domain URL chunk of a specific URL chunk do not amount to classifying the parent domain URL chunk as suspicious, classification of the specific URL chunk may be affected by classifications of a sibling family tree of URL chunks. In effect the URL classifier module 306 may have a feedback mechanism that changes classification criteria based on classifications previously made on a hierarchy of URL chunks being classified.

The action filter module 310 may include a dissemination gate module 342 and a remedial flow module 344. The dissemination gate module 342 acts a filter to prevent user actions from being executed that may cause sharing or dissemination of URL chunks. The dissemination gate module 342 may prevent a user action from being executed in response to classification of a URL chunk into a "bad" state or a "suspicious" state. The dissemination gate module 342 may further require a user to interact with a suspicious content interface when a URL chunk is classified as "suspicious." The content containing the URL may be grayed out in a manner further elaborated below. The user may be asked to indicate whether the URL chunk or whether the content is considered "spam." The user may also be asked to fill out a CAPTCHA (i.e., a challenge response test) prior to executing a user action related to a suspicious URL chunk. The CAPTCHA solve rate and/or solve time may be collected by the feature extractor 326 and later used by the URL classifier module 306 to classify the URL chunk based on distribution of the solve rate and the solve times.

The remedial flow module 344 responses to classification of a URL chunk as a specific type of "bad" URL chunk. The remedial flow module 344 guides a user through a remedial flow interface when specific types of bad URL chunks are detected. For example, when a URL chunk is classified as having being posted via phishing, the remedial flow interface may guide the user to change account password. For another example, when a URL chunk is classified as having being posted via malware, the remedial flow interface may guide the user to a malware removal tool.

Figure 4:
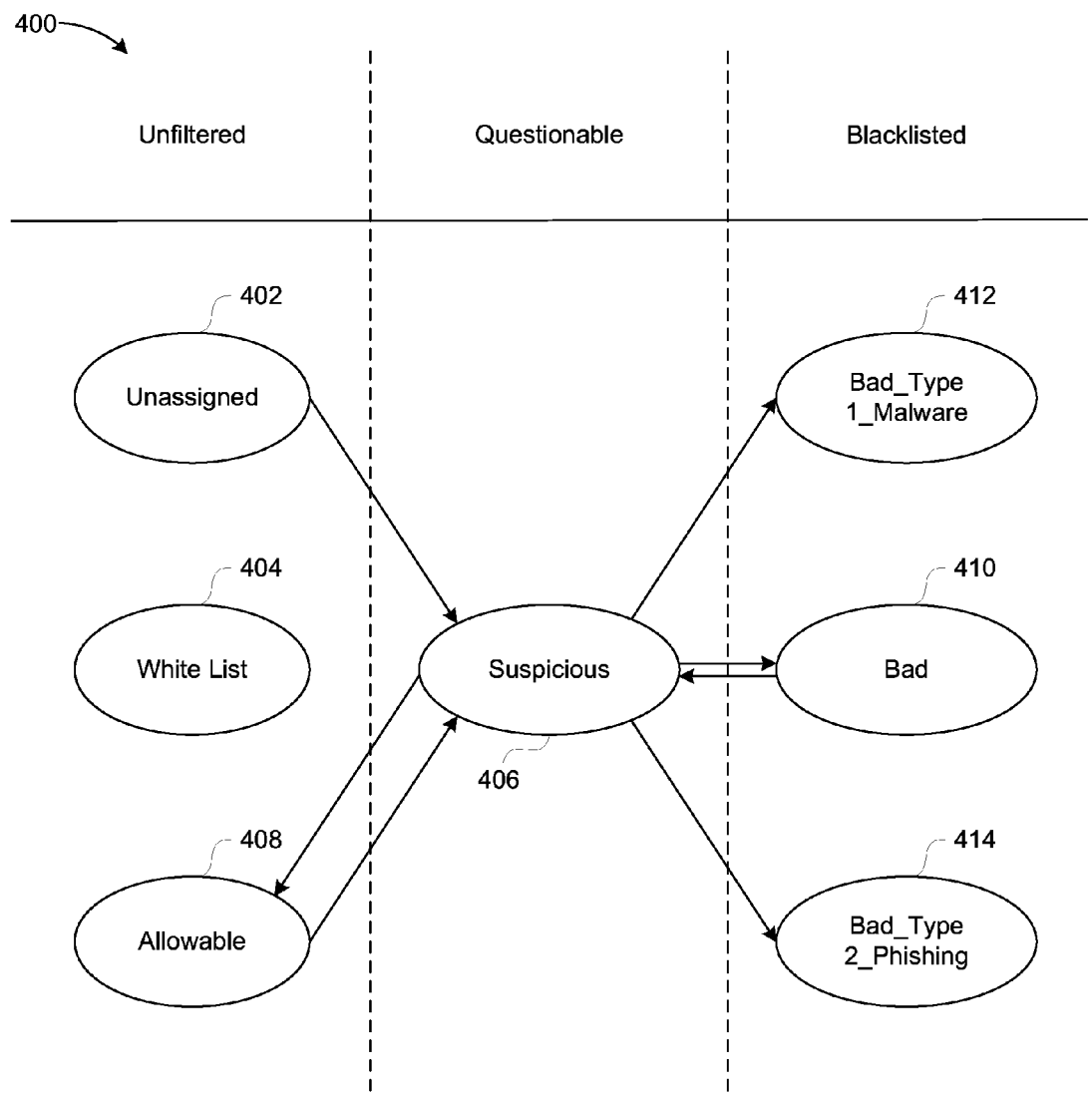
FIG. 4 is a finite state machine diagram illustrating classifications of a URL by a URL spam detection system.

FIG. 4 is a finite state machine diagram illustrating classifications 400 of a URL by a URL spam detection system, such as the URL spam detection system 301 of FIG. 3. The classifications 400 are states associated with a URL chunk stored in a URL state store, such as the URL state store 308 of FIG. 3. The classifications include an unassigned state 402. URL chunks that are not given a white list state 404 are assigned the unassigned state 402. When a URL chunk is in the unassigned state 402, an action filter, such as the action filter module 310 of the social networking system 300, would not prevent the URL chunk from being shown in the social networking system 300. Likewise, when a URL chunk is in the white list state 404, the action filter would not prevent the URL chunk from being shown in the social networking system 300. Once a URL chunk is in the white list state 404, the URL chunk remains in this state unless removed manually.

When a URL classifier module, such as the URL classifier module 306 of FIG. 3, detects one or more anomalies in one or more feature distributions of a URL chunk, the classification 400 of the URL chunk is changed to a suspicious state 406. In one example, the URL spam detection system requires a predefined number of anomalies detected in the feature distributions of the URL chunk in order to change the classification to the suspicious state 406. Whilst a single anomaly may generate false positives, requiring several anomalies at once is advantageous because the rate of false positives may decrease significantly.

Once in the suspicious state 406, the URL classifier module monitors the feature distributions of the URL chunk. In one example, the frequency of checking the feature distributions is increased. When the existing anomalies of the feature distributions of the URL chunk return to within an expectation threshold, such as that the expectation threshold for such anomalies in the threshold store 334 of FIG. 3, the URL chunk can change to an allowable state 408.

In another example, a destination page of the URL chunk is grayed out until a user accessing the destination page specifies whether or not the destination page contains spam. The users of the social networking system can click on a link, which is directed to the URL of which the URL chunk is part of, when the poster embeds the URL in the text of a message. A user interface, such as an iframe interface, overlays the destination page allowing someone who has clicked on the link to mark the link as spam or not spam. With enough affirmation from a certain number of users that the content object is not spam, the URL chunk is changed to the allowable state 408. In some examples of the URL classifier module, a URL chunk in the allowable state 408 can transition back to the suspicious state 406 when anomalies with the feature distributions of the URL chunk are again detected.

In one example, when more anomalies of the feature distributions of the URL chunk are detected or when the existing anomalies of the feature distributions of the URL chunk deviates further from the expectation threshold, the URL chunk is changed from the suspicious state 406 to a bad state 410. In another example, the URL spam detection system requires a predefined number of anomalies detected in the feature distributions of the URL chunk in order to change the classification to the bad state 410. In yet another example, with enough confirmation from a certain number of users that a URL or a URL chunk is spam, then the URL chunk is changed to the bad state 410.

Optionally, the URL classifier module can classify types of illegitimate URL chunks based on the anomalies in the feature distributions. Different dimensions of feature distribution anomalies are associated with different types of illegitimate URL chunks. The types of illegitimate URL chunks can be based on different illegitimate channels of sharing such URL chunks. For example, the URL classifier module can classify a URL chunk under a malware state 412.

For another example, the URL classifier module can classify a URL chunk under a phishing URL state 414. The phishing URL state 414 may be associated with an anomaly in a feature dimension involving numbers of times a sender account experienced failed login attempts. The phishing URL state 414 can also be associated with an anomaly in a feature dimension involving number of recent login attempts occurred outside a geographical location of the sender account profile. In some examples of the URL classifier module, multiple illegitimate URL dissemination types (i.e., "attacks") may be detected via a single feature dimension. In other examples, a single feature dimension and a single expectation threshold may correspond to a single type of illegitimate URL dissemination method.

Users may appeal a classification state of a URL chunk. For example, a URL chunk in one of the "bad" states, such as the bad state 410, the malware URL state 412, or the phishing URL state 414, may return the suspicious state 406 or the allowable state 408 based on a user appeal. Likewise, a URL chunk in the suspicious state 406 may change to the allowable state 408 based on a user appeal. The user appeal process may be automated, where certain number of appeals initializes a change of classification. The user appeals may be monitored by the URL classification module as well. Hence, a malware attempting to game the user appeal process may be detected by triggering an anomaly in the feature distributions of the user appeal actions.

Figure 5:
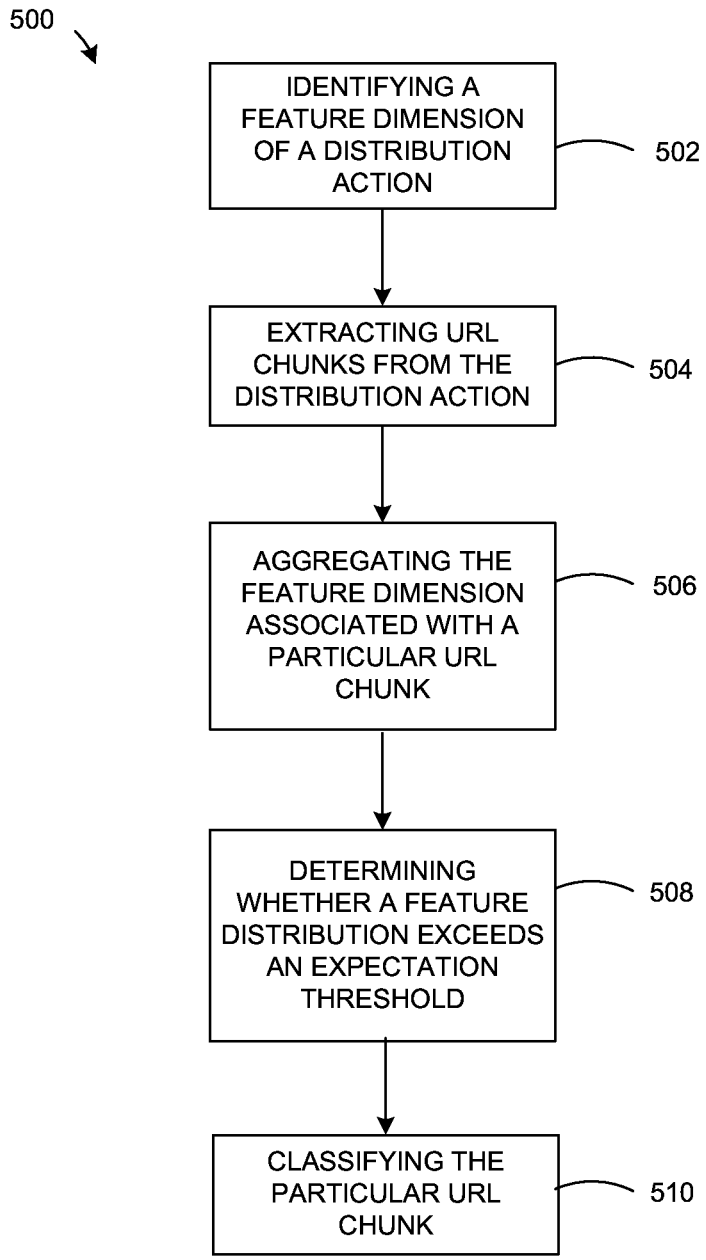
FIG. 5 is a flow chart of a method of operating a URL spam detection system.

FIG. 5 is a flow chart of a method 600 of operating a URL spam detection system, such as the URL spam detection system 102 of FIG. 1, the URL spam detection system 222 of FIG. 2, or the URL spam detection system 301 of FIG. 3. The method 600 includes identifying a feature dimension of a user action on a social networking system to detect anomalies in a step 502. The step 502 can be executed by a classifier configuration module 329 of FIG. 3. URL chunks are extracted from content associated with the user action in a step 504. The step 504 can be executed by the URL chunk extractor module 324 of FIG. 3.

Following extraction of the URL chunks, one or more non-content features of the user action is aggregated into a URL statistic store, such as the URL statistic database 118 of FIG. 1, to produce a feature distribution for each of the URL chunks in a step 506. The one or more non-content features and the feature distribution are along the feature dimension identified in step 502. The step 506 can be executed by the aggregator modules 328 of FIG. 3. Either synchronously to receipt of the user action or asynchronously, the URL spam detection system can determine whether the feature distribution of a particular URL chunk within the URL chunks exceeds an expectation threshold in a step 508. The expectation threshold can be read from the threshold store, such as the threshold store 334 of FIG. 3. The step 508 can be executed by the URL classifiers 306 of FIG. 3.

The URL spam detection system classifies the particular URL chunk an illegitimate URL when the feature distribution exceeds the expectation threshold in a step 510. Once classified as an illegitimate, access to the particular URL chunk is restricted on the social networking system. The step 510 can be executed by the action filter module 310 of FIG. 3. The feature distribution can exceed that the expectation threshold if the feature distribution has more than a threshold number of samples outside of a threshold range. The feature distribution can also exceed the expectation threshold if the feature distribution is a threshold variance away from an expected distribution. The feature distribution can exceed the expectations threshold if the mean, median, or mode of feature distribution is beyond a threshold range.

Figure 6:
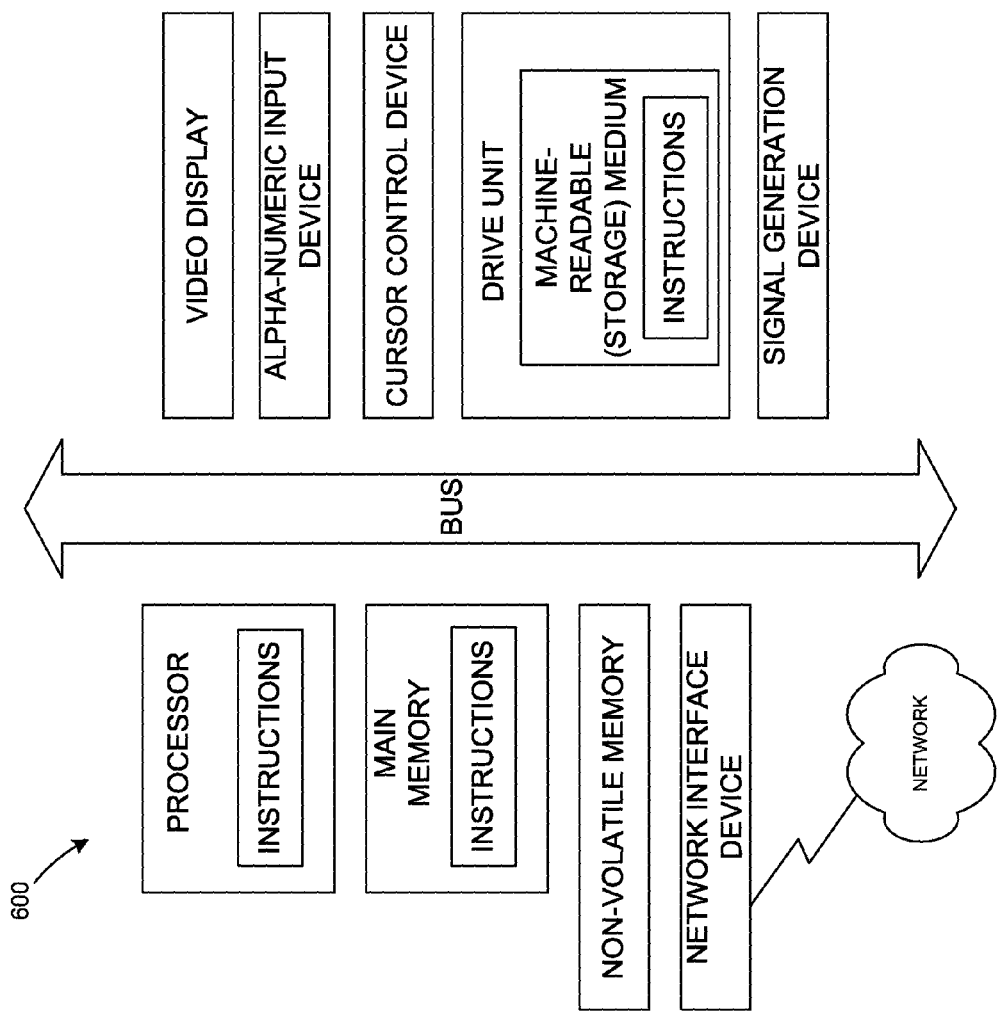
FIG. 6 is a diagrammatic representation of a machine in the example form of a computer system within which a set of instructions, for causing the machine to perform any one or more of the methodologies or modules discussed herein, may be executed.

Referring now to FIG. 6, therein is shown a diagrammatic representation of a machine in the example form of a computer system 600 within which a set of instructions, for causing the machine to perform any one or more of the methodologies or modules discussed herein, may be executed.

In the example of FIG. 6, the computer system 600 includes a processor, memory, non-volatile memory, and an interface device. Various common components (e.g., cache memory) are omitted for illustrative simplicity. The computer system 600 is intended to illustrate a hardware device on which any of the components depicted in the example of FIGS. 1-3 (and any other components described in this specification) can be implemented. The computer system 600 can be of any applicable known or convenient type. The components of the computer system 600 can be coupled together via a bus or through some other known or convenient device.

This disclosure contemplates the computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 600. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 600. The interface can include an analog modem, ISDN modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 6 reside in the interface.

In operation, the computer system 600 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting the invention to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

Those of skill in the art will appreciate that the invention may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative embodiments may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. §112, ¶6 will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non transitory, tangible computer readable storage medium and may include any embodiment of a computer program product or other data combination described herein.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method, comprising:
    identifying a feature dimension on a social networking system to detect anomalies, the feature dimension being a non-content feature dimension;
    extracting URL chunks from content associated with a user action, wherein the user action records an interaction between a user account and a content object and wherein the user action is captured by an action logger of the social networking system;
    maintaining a plurality of feature distributions respectively corresponding to a plurality of unique URL chunks identified in content of a plurality of user actions occurring on the social networking system, wherein each of the feature distributions represents an aggregation of non-content features along the identified feature dimension across the plurality of user actions for a unique URL chunk of the plurality of unique URL chunks;
    aggregating a non-content feature of the user action along the identified feature dimension into a subset of the plurality of feature distributions respectively corresponding to the extracted URL chunks;
    determining whether a feature distribution of a particular URL chunk from the plurality of feature distributions of the URL chunks exceeds an expectation threshold for the feature dimension, wherein the expectation threshold corresponds to a characterization of an expected distribution along the identified feature dimension; and
    classifying the particular URL chunk as an illegitimate URL when the feature distribution exceeds the expectation threshold to restrict access to the particular URL chunk on a social networking system.

2. The method of claim 1, wherein identifying the feature dimension includes identifying the feature dimension of one or more content sharing actions to disseminate content in the social networking system.

3. The method of claim 1, wherein identifying the feature dimension includes identifying the feature dimension of one or more association actions of one or more user accounts to associate with content in the social networking system.

4. The method of claim 1, wherein identifying the feature dimension includes identifying the feature dimension of one or more indirect association actions of one or more user accounts to associate with a social object affiliated with content in the social networking system.

5. The method of claim 1, wherein aggregating the non-content feature includes aggregating within a time window wherein the feature distribution is a moving distribution along the feature dimension.

6. The method of claim 1, further comprising determining the expectation threshold by machine learning against known reliable URL chunks and known spam URL chunks.

7. The method of claim 1, further comprising determining the expectation threshold by machine learning against known spammer user accounts and known reliable user accounts.

8. The method of claim 1, wherein the feature distribution is a binomial distribution of whether the non-content feature exists for the user action.

9. The method of claim 1, wherein the feature distribution is a discrete distribution of enumerated states along the feature dimension.

10. The method of claim 1, wherein the feature distribution is a continuous distribution along the feature dimension.

11. The method of claim 1, wherein extracting the URL chunks includes extracting the URL chunks from an embedded URL and one or more redirects of the embedded URL, the URL chunks being one or more subsets of the embedded URL delimited by one or more punctuations.

12. The method of claim 11, wherein classifying the particular URL chunk is based on classification of a related URL chunk in a sibling family tree of the particular URL chunk, the sibling family tree and the particular URL chunk sharing a parent domain URL chunk.

13. A method, comprising:
    identifying a feature dimension on a social networking system to detect anomalies;
    extracting URL chunks from content associated with a user action, wherein the user action is an interaction between a user account and a content object and wherein the user action is captured by an action logger of the social networking system;
    aggregating a sender feature of the user action along the identified feature dimension into a plurality of feature distributions respectively corresponding the extracted URL chunks;
    detecting an anomaly in a feature distribution of a particular URL chunk, the feature distribution from the plurality of feature distributions of the extracted URL chunks, wherein said detecting includes comparing the feature distribution to an expected distribution along the feature dimension; and
    raising a suspicion level of the particular URL chunk when the anomaly is detected.

14. The method of claim 13, wherein the expected distribution is a superset feature distribution of a superset URL chunk containing the particular URL chunk.

15. The method of claim 13, wherein the expected distribution is a white list feature distribution of known reliable URL chunks.

16. The method of claim 13, wherein raising the suspicion level includes raising the suspicion level when a pre-defined number of anomalies are detected along multiple feature dimensions.

17. The method of claim 13, wherein raising the suspicion level includes classifying the particular URL chunk under a specific type of illegitimate sharing channel.

18. The method of claim 13, wherein raising the suspicion level includes storing the suspicion level associated with the particular URL chunk in a classification table for a filter module restricting execution of the user action.

19. The method of claim 13, further comprising:
    tracking the feature distribution to determine whether the anomaly of the feature distribution subsides within an acceptable threshold range of the expected distribution; and
    lowering the suspicion level when the anomaly subsides.

20. A processor-based system, comprising:
    a feature collector module stored on a non-transitory memory, when executed by a processor is configured to:
        identify a feature dimension on a social networking system, the feature dimension being a non-content feature dimension;
        extract URL chunks from content associated with a user action, wherein the user action is an interaction between a user account and a content object and wherein the user action is captured by an action logger of the social networking system;
        aggregate a sender feature of the user action along the feature dimension into a plurality of feature distributions respectively corresponding to the extracted URL chunks, the plurality of feature distributions stored in a URL distribution store; and
    a URL classifier module stored on a non-transitory memory, when executed by a processor is coupled to the feature collection module via the URL distribution store and configured to:
        detect an anomaly in a feature distribution of a particular URL chunk, the feature distribution from the plurality of feature distributions of the extracted URL chunks, by comparing the feature distribution to an expected distribution; and
        raise a suspicion level of the particular URL chunk when the anomaly is detected.

21. The method of claim 1, wherein the expectation threshold corresponds to an expected range, expected mean, expected median, an expected mode, an expected variance, or any combination thereof, of the feature distribution.

* * * * *